United States Patent [19]

Casey et al.

[11] Patent Number: 4,483,770

[45] Date of Patent: Nov. 20, 1984

[54] FLUID FILM BEARING FOR USE IN HORIZONTAL BELT VACUUM FILTERS

[75] Inventors: Francis J. Casey, Edison; Ernest T. DePass, Bound Brook; Kevin R. Gilman, Pequannock, all of N.J.

[73] Assignee: Enviro-Clear Company, Inc., Somerville, N.J.

[21] Appl. No.: 423,627

[22] Filed: Sep. 27, 1982

[51] Int. Cl.³ .............................................. B01D 33/04
[52] U.S. Cl. .................................. 210/401; 210/416.1; 198/811; 271/195; 34/156; 226/97
[58] Field of Search ...................... 210/400, 401, 416.1; 226/7, 97; 198/811; 271/195, 198, 275; 34/156; 209/307, 470

[56] References Cited

U.S. PATENT DOCUMENTS

| | | | |
|---|---|---|---|
| 2,963,161 | 12/1960 | Holland | 210/401 |
| 3,087,664 | 4/1963 | Streeter | 226/97 |
| 3,319,856 | 5/1967 | Stanley | 226/97 |
| 3,347,389 | 10/1967 | Krynski | 210/401 |
| 3,941,238 | 3/1976 | Lapeyre | 198/811 |
| 4,265,765 | 5/1981 | Gallotini | 210/401 |
| 4,285,815 | 8/1981 | Gallotini | 210/400 |
| 4,338,193 | 7/1982 | Lautrette et al. | 210/401 |

Primary Examiner—Richard V. Fisher
Assistant Examiner—John W. Czaja
Attorney, Agent, or Firm—Cooper, Dunham, Clark, Griffin & Moran

[57] ABSTRACT

An aircushion and fluid film bearing arrangement particularly suitable for supporting the undersurfaces of the outer edges of the transport belt in a horizontal belt vacuum filter is disclosed wherein the respective air box sections beneath the edges are fabricated into parallel members each exteriorly rectangular in form and having an air pressure chamber therein triangular in cross-section with its apex forming a longitudinal slot centrally disposed in the flat upper surface of the box, which slot communicates the air pressure admitted to the chamber to the upper surface of the box. Longitudinal sealing guides are upstandingly mounted on the upper edges of each air box and form fluid-pressure chambers above the flat upper surfaces in cooperation with the undersurface of the transport belt, which chambers contain the communicated air pressure and create a fluid cushion exerting evenly balanced supporting forces across the outer undersides of the belt. In addition, the sealing guides have flat upper surfaces above which fluid film air bearings are formed which restrict edge leakage of the air from the fluid cushion while preventing direct contact of the belt undersurface with any parts of the air boxes.

5 Claims, 4 Drawing Figures

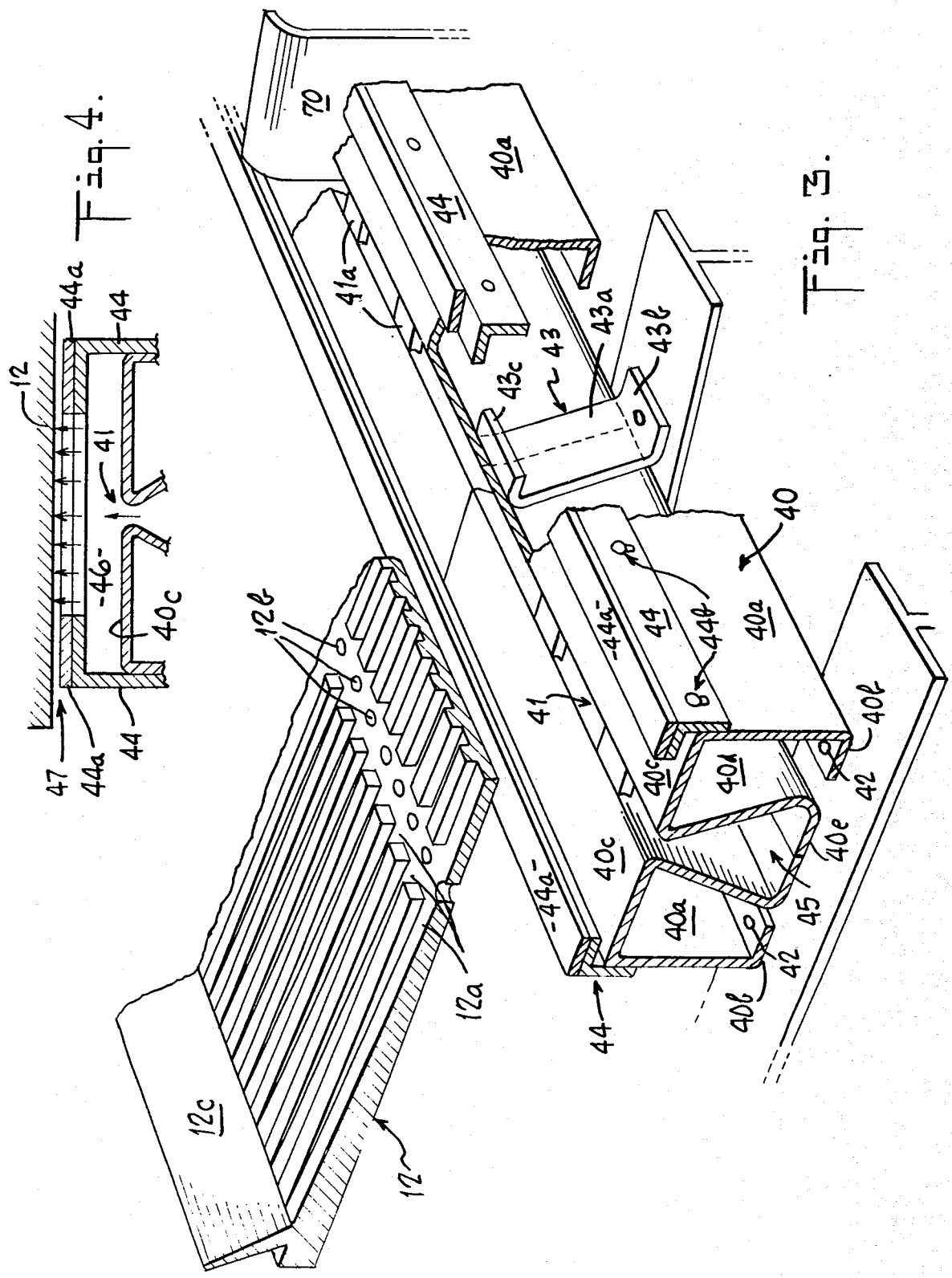

FLUID FILM BEARING FOR USE IN HORIZONTAL BELT VACUUM FILTERS

BACKGROUND OF THE INVENTION

The present invention relates to horizontal belt vacuum filters and more particularly to a fluid aircushion and fluid film air bearing arrangement for supporting the outer undersurfaces of the transport belt used in such filters to provide a more evenly balanced supporting force across the belt thus distributing the frictional forces acting thereon and reducing uneven belt wear.

Horizontal belt vacuum filters have been successfully used for filtration and washing applications in the chemical, food and mineral processing industries. Such filters of various constructions are available commercially but many problems have been experienced with regard to continuous reliable service and ready and easy maintenance in the adverse operating environments encountered in chemical and mineral processing operations.

For example, a basic problem in these filters is the supporting of the horizontal transport belt in a manner to minimize the friction thereon and the resulting wear during its continuous movement while filter is in operation.

An example of a typical prior art filter, and one on which the present invention is intended to improve, is one in which the outer ends of the transport belt are supported by respective fluid film bearings produced by means of air boxes containing rectangular pressurized chambers and having a series of pressure releasing holes across their flat upper surfaces. The pressurized air from the interiors of the air boxes escapes through the holes in the flat upper surfaces and forms fluid layers or air slides on which the undersurface of the transport belt rides.

With this arrangement, if the top surfaces of the air boxes are not completely flat, air escapes at the outer edges so that the contact pressure on the undersurface of the belt is uneven and concentrates on those top areas which are highest tending to stop all air flow in those areas and thereby allowing the air pressure to dissipate through the randomly occurring lower top areas. This uneven pressure results in a significant increase in frictional drag on the underside of the transport belt. While this system has generally operated in a satisfactory manner, it has been found that with extended use the uneven pressure gradient acting on the underside of the belt results in some areas of the belt experiencing excessive wear in the region or regions where the box is irregular either transversely or longitudinally.

The present invention is intended to overcome the problem presented by uneven support pressure acting on the underside of the belt that can result in uneven belt wear by providing an improved air box construction which produces an evenly balanced support pressure and thus promotes long belt life.

For an understanding of the principles involved in fluid film bearings and a review of the prior art, reference may be had to the text "Fluid Film Lubrication" by William A. Gross, et al. published by Wiley Interscience, 1980, John Wiley & Sons, New York.

SUMMARY OF THE INVENTION

An aircushion and fluid film air bearing arrangement is produced in accordance with the present invention by means of an elongated air box which may be fabricated in sections out of sheet material with a generally rectangular exterior form and an internal chamber generally triangular in section. The box comprises upstanding side walls having inturned flanges at their lower ends for mounting on support structure, and horizontally disposed walls on their upper ends forming a flat upper surface centrally divided by a longitudinal slot opening into the triangular chamber below. Each of the upper edges of the air box is provided with a longitudinal sealing guide in the form of an inverted L-shaped member having a layer of low friction material disposed on its upper surface parallel to the upper surface of the air box. Fluid, such as air, under is admitted into the triangular chamber and is communicated through the slot to the upper surface of the air box. The sealing guides then form a substantially fluid-tight chamber, in combination with the air box upper surface and the underside of any flat member extending between the guides such as a transport belt in a horizontal built vacuum filter. By means of the chamber thus formed above the surface of the air box, air pressure is applied to the undersurface of such a member when riding along above the low friction surfaces of the sealing guides, and acts as a fluid film cushion and bearing for supporting the member along its path of movement. The resulting pressure in the chamber provides an evenly balanced supporting force across the belt undersurface thus distributing the frictional forces acting thereon and reducing uneven belt wear. The sealing guides in combination with the center slot act to contain the air in such a manner as to make its distribution uniform by restricting the edge leakage which in the experience of the prior art destroys uniform support.

BRIEF DESCRIPTION OF THE DRAWINGS

FIG. 3 is a perspective view partly in section and with parts broken away illustrating the construction of a preferred embodiment in accordance with the present invention.

FIG. 4 is a sectional view in elevation taken near the end of an air box illustrating the details of the aircushion and fluid film air bearing arrangement of the present invention.

DETAILED DESCRIPTION OF THE PREFERRED EMBODIMENT

Figure 1:
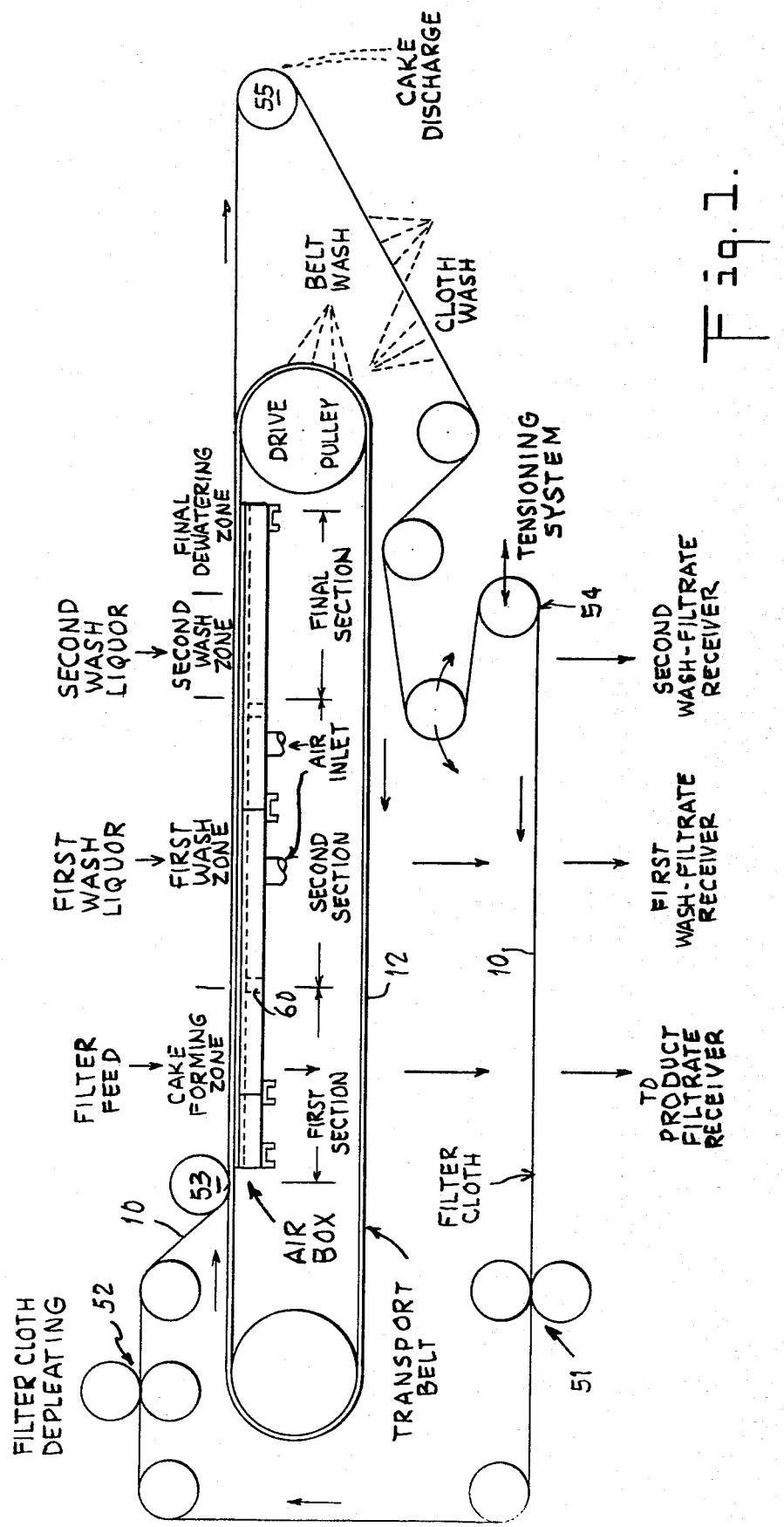
FIG. 1 is a typical flow sheet illustrating the operational steps carried out by and in connection with a horizontal belt vacuum filter of the type with which the present invention may be used.

A horizontal belt vacuum filter system of the type with which the present invention may be used is shown diagrammatically in FIG. 1. The filter system illustrated has two wash zones producing three filtrate streams but filters of this type may be arranged to provide both dewatering and washing, or only dewatering and when designed to include washing the number of wash stages and the wash arrangement may be varied to optimize the process. The filter comprises a continuously moving endless filter cloth 10 onto which a feed slurry or other mixture to be filtered is directed by a distributor (not shown) which spreads the slurry evenly across the cloth. The filter cloth 10 rides on and with a continuously moving transport belt 12 that is provided with a series of drainage grooves 12a and drainage holes 12b along its length for respectively directing and passing the filtrate therethrough. As best seen in FIG. 3, the belt grooves 12a are sloped toward the center of the belt 12 to promote complete drainage of the filtrate through the drainage holes 12b. A series of guide rollers 50 are provided (FIG. 2) along each side of the transport belt 12 to limit its lateral movement so that the drainage holes 12b are always in a properly aligned position with respect to an entrance slot 14a extending the length of a vacuum box 14 disposed beneath the belt. This alignment ensures that maximum vacuum is being delivered to the surface of the filter cloth 10 and that all of the filtrate is drained into the vacuum box 14.

Tracking of the filter cloth 10 is accomplished by various methods of adjustable rollers either pinch type or variable angle rollers 51 that may be automatically controlled by air sensors (not shown) located at the outer cloth edges in response to which the roller or rollers are activated when the cloth strays from its proper path. To maintain proper filter cloth tension which is important in obtaining good cloth performance and permitting clean cake discharge, an automatic tension control roller 54 is provided which is activated by a preset air pressure cylinder.

The cake forming zone extends from the feed dam roller 53 to an adjustable vacuum box dam 60 which separates the cake forming zone from the first wash zone. By adjusting the latter dam, the cake forming area can be varied to meet process requirements. The filtrate from the cake forming zone is collected in the first section of the vacuum box 14 from where it flows through outlet 14b to a suitable filtrate receiver 70 (FIG. 2).

As seen in FIG. 1, the filter cake moves with the filter cloth 10 past the adjustable dam 60 into the first wash zone wherein wash liquid is distributed evenly across the cake without disturbing the formed cake and a flooded condition is maintained in this zone. The wash filtrate from the first wash zone is collected in a second section of the vacuum box 14 from where it flows to the first wash filtrate receiver 70. In like manner, the cake is carried to the second wash zone and then to the final dewatering zone. The filtrate from the second wash and final dewatering zone is collected in the remaining section of the vacuum box 14 from where it flows to a second wash filtrate receiver. As the filter cloth 10 leaves the last zone, it separates from the transport belt 12 and enters the cake discharge area where a sharp change in cloth direction over a small diameter roller 55 causes the cake to separate from the cloth 10. The cloth 10 is then spray washed on both sides to remove any remaining solids and the transport belt 12 which carries the cloth is also spray washed to clean the drainage grooves and to maintain a clean surface for each cycle of the belt.

The illustrated flow arrangement may also be utilized for countercurrent washing by applying a clean wash liquor as the second wash liquid and returning the second wash filtrate obtained in the final section of the vacuum box 14 as first wash liquid. High wash efficiency can thus be obtained with a minimum of wash liquid.

Figure 2:
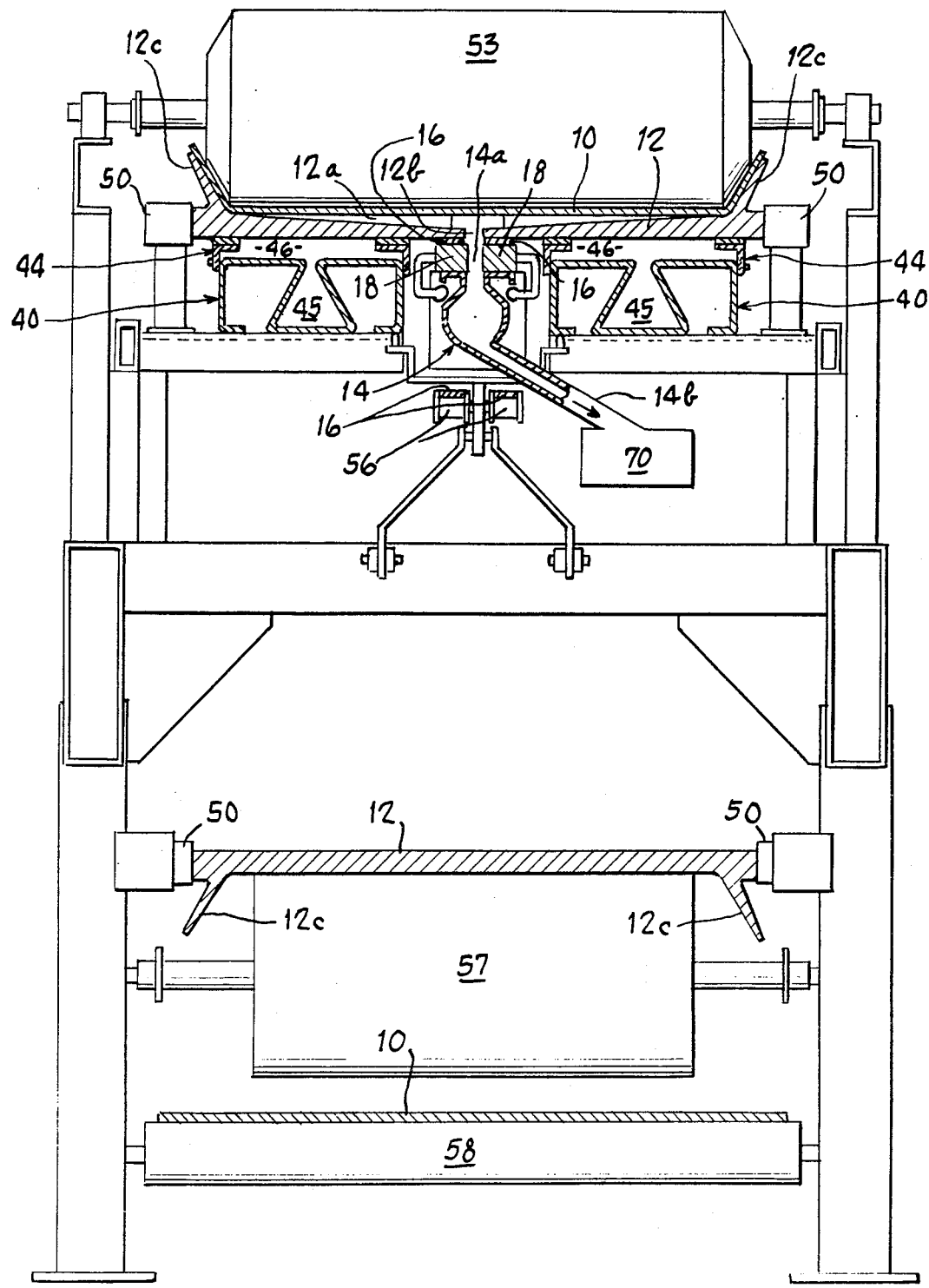
FIG. 2 is a diagrammatic view in elevation and partly in section illustrating the operating components of a horizontal belt vacuum filter incorporating an aircushion fluid film air bearing apparatus in accordance with the present invention.

As seen particularly in FIG. 2, the transport belt 12 is provided with curbing 12c for forming a trough above its upper surface to receive the slurry and is supported near its center by water-lubricated wear belts 16 sliding in grooves on the upper surfaces of wear strips 18 which are mounted on horizontal flanges 20 on the upper portion of vacuum box 14. Respective idler rollers 56, 57 and 58 for the wear belt, transport belt and filter cloth are variously mounted on the support structure for guiding the return portions of these three continuously-moving endless belts.

The outer ends of the transport belt 12 are supported by means of fluid film air bearings and aircushions produced in accordance with the present invention which will now be described.

In contrast to the prior art fluid film bearings produced by means of air boxes with rectangular pressurized chambers having a series of pressure releasing holes across their upper surfaces for forming the film, the present invention replaces the holes with a centrally disposed longitudinal slot, and in contrast to the open edges permitting escape of the air in the prior art arrangements, longitudinal edge sealing members are provided with the invention to contain the air in a second chamber, the upper surface of which is the outer undersurface of the transport belt. The air in the second chamber forms an aircushion bearing for the undersurface of the belt and flat surfaces on the upper ends of the sealing members form fluid film air bearings using the air from the chamber.

More particularly, as seen in FIG. 3, each of the air boxes 40 may be fabricated in sections out of sheet material into a member exteriorly rectangular in form and having a chamber 45 therein generally triangular in cross section. The rigid member may be extruded, rolled or cast in a single piece or assembled from two identical pieces joined by bonding or welding at the center of the base of the triangular chamber 45. When formed or assembled, each air box comprises upstanding side walls 40a having inturned flanges 40b at their lower ends and horizontally disposed walls 40c on their upper ends forming a flat upper surface centrally divided by a longitudinal slot 41 opening into the triangular chamber 45 below. Chamber 45 is formed by inclined side walls 40d and a base wall 40e that may lie in the plane of the inturned flanges 40b. The inturned flanges 40b may be used to fix the air box by suitable fastening means such as bolting 42 to the filter support structure.

Suitable spacing members 41a may be disposed in the longitudinal slot 41 in the air box to ensure uniform spacing of the edges and thus the size of the slot.

If the box 40 is assembled in sections, the sections may be inserted between and sealed by pairs of clamping members 43. Each clamping member 43 has a main wall 43a, inclined and engaging the outer surface of the wall 40d of the air box triangular chamber, with a lower flange 43b for fastening it to the filter support structure in the manner of the air box inturned flanges 40b and an upper flange 43c engaging the undersurface of top wall 40c of the air box. The box when assembled is fitted with end members to complete the enclosing of the interior.

Each of the upper edges of the air box is provided with a longitudinal sealing guide in the form of an L-shaped member 44 having a layer 44a of a low friction material, such as Teflon, disposed on its upper surface parallel to the upper surface of the air box. Similar members are provided at the box ends. Each guide member 44 may be adjustably mounted by suitable fastening means 44b on the upper portion of upstanding wall 40a of the air box so as to permit variation of the size of the aircushion chamber 46 that will be formed above the top surface of the air box when the undersurface of the transport belt 12 is disposed above and across the low friction surfaces 44a on the sealing guides. This adjustability is also important in permitting the establishment of a parallel plane alignment with the vacuum box wear belts 16.

In operation, it will be seen that pressurized air is admitted into the triangular chamber 45 and is communicated to the upper surface of the air box through the longitudinal slot 41. As seen in FIG. 4, the undersurface of the moving belt 12 in cooperation with the upper surface 40c of the air box, sealing guide members 44 and the air film bearings 47 formed above surfaces 44a, forms a second pressurized chamber 46 that creates a fluid cushion bearing on which the undersurface of the belt 12 may ride. The pressure in the chamber 46 by virtue of controlled leakage of air at the edges through the air film bearings will be comparatively uniform across the entire undersurface of the belt 12 constituting the upper wall so that uneven frictional forces on the belt undersurface are minimized and uneven wear eliminated during continuous use of the belt. In addition, the formation of the second chamber 46 with minimum leakage also permits greater pressure to be built up in creating the fluid cushion thus reducing the frictional forces acting on the underside of the belt 12.

The adjustable sealing guides, as noted, permit orienting of the air box 40 properly with respect to the adjacent vacuum box 14 which further ensures a controlled air release and effective fluid film air bearings.

In addition to the end members, one or more dams such as the member 70, may be disposed along the length of the air box 40, conveniently at a section joint, to divide the air chamber 45 and/or the chamber 46 into zones of differing pressure proportional to varying applied external loads, if desired. All of the joints between the air box, the support structure, and the clamping members may be sealed with silicon rubber adhesive to avoid air leakage or any buildup of process materials and resultant corrosion.

It will accordingly be seen that an improved aircushion and fluid film air bearing arrangement is provided that operates to produce a more evenly balanced supporting force across the undersurface of a member riding thereon, such as a transport belt used in horizontal belt vacuum filters, thereby reducing uneven belt wear. A single source of air pressure admitted through a longitudinal slot creates the central air cushion bearing and the fluid film air bearings on each side, which arrangement operates to prevent any direct contact between the belt surface and any of the mechanical parts. In addition, the mechanical parts may be readily formed and assembled and are easily maintained.

While air has been described as the fluid in forming the bearings, other gases or compressible fluids may also be found suitable carrying out the invention.

What is claimed is:

1. A horizontal belt vacuum filter of the type comprising:
   (a) continuously moving filter cloth means for receiving and filtering a feed slurry deposited thereon;
   (b) continuously moving transport belt means for supporting said filter cloth means and having means therein for passing the filtrate therethrough;
   (c) vacuum box means disposed beneath said transport belt means for drawing the filtrate through said filtrate passing means; and
   (d) fluid bearing means disposed on the opposite sides of said vacuum box means for supporting the outer ends of said moving transport belt means;
the improvement wherein said fluid bearing means comprises:
   (a) box means, having a flat upper surface with a centrally disposed longitudinal opening therein, for communicating a compressible fluid under pressure upwardly therefrom;
   (b) chamber means in said box means extending along and communicating with said opening for receiving said fluid under pressure and communicating it to said opening; and
   (c) guide means disposed along the upper edges of said box means for forming a substantially fluid-tight chamber in combination with said flat upper surface and the underside of said moving transport belt means, said guide means comprising two L-shaped members, and fastening means for connecting said L-shaped members respectively to a pair of spaced upstanding side walls of said box means, one leg of each of said L-shaped members being in a plane parallel to said moving transport belt means whereby a fluid aircushion bearing is formed for supporting said underside of said moving transport belt means.

2. A fluid bearing for supporting a member moving longitudinally therealong, comprising:
   (a) box means, having a flat upper surface with a centrally disposed longitudinal opening therein, for communicating a fluid under pressure upwardly therefrom;
   (b) chamber means in said box means extending along and communicating with said opening for receiving fluid under pressure and communicating it to said opening, and
   (c) guide means disposed along the upper edges of said box means for forming a substantially fluid tight chamber in combination with said flat upper surface and the underside of a moving member, said guide means comprising two L-shaped members, and fastening means for connecting said L-shaped members respectively to a pair of spaced upstanding side walls of said box means, one leg of each of said L-shaped members being in a plane parallel to said moving member, whereby a fluid cushion bearing is formed for supporting said underside of said moving member.

3. A bearing as in claim 2, wherein said L-shaped members comprise two layers of low friction material, said material being disposed on the upper surface of each of said one leg of said L-shaped members, for forming fluid from air bearings between said underside of said moving member and said layers.

4. A bearing as in claim 2 wherein said box means is constructed of sheet material and comprises:
   (a) said spaced upstanding side walls;
   (b) inturned flanges on the lower ends of said side walls; and
   (c) horizontally disposed walls on the upper ends of said side walls forming a flat upper surface centrally divided by said opening.

5. A bearing as in claim 4 wherein said chamber means is constructed of sheet material and comprises:
   (a) inwardly inclined side walls with upper edges joining the inner ends of said upper walls at the opening; and
   (b) a base wall connected to the lower ends of said inclined walls and lying in the plane of said inturned flanges.

* * * * *

UNITED STATES PATENT AND TRADEMARK OFFICE
CERTIFICATE OF CORRECTION

PATENT NO. : 4,483,770

DATED : November 20, 1984

INVENTOR(S) : Francis J. Casey et al.

It is certified that error appears in the above-identified patent and that said Letters Patent is hereby corrected as shown below:

In the (GRANT ONLY) insert Columns 5 and 6.

Signed and Sealed this

Ninth Day of April 1985

[SEAL]

Attest:

DONALD J. QUIGG

Attesting Officer     Acting Commissioner of Patents and Trademarks size of the aircushion chamber 46 that will be formed above the top surface of the air box when the undersurface of the transport belt 12 is disposed above and across the low friction surfaces 44a on the sealing guides. This adjustability is also important in permitting the establishment of a parallel plane alignment with the vacuum box wear belts 16.

In operation, it will be seen that pressurized air is admitted into the triangular chamber 45 and is communicated to the upper surface of the air box through the longitudinal slot 41. As seen in FIG. 4, the undersurface of the moving belt 12 in cooperation with the upper surface 40c of the air box, sealing guide members 44 and the air film bearings 47 formed above surfaces 44a, forms a second pressurized chamber 46 that creates a fluid cushion bearing on which the undersurface of the belt 12 may ride. The pressure in the chamber 46 by virtue of controlled leakage of air at the edges through the air film bearings will be comparatively uniform across the entire undersurface of the belt 12 constituting the upper wall so that uneven frictional forces on the belt undersurface are minimized and uneven wear eliminated during continuous use of the belt. In addition, the formation of the second chamber 46 with minimum leakage also permits greater pressure to be built up in creating the fluid cushion thus reducing the frictional forces acting on the underside of the belt 12.

The adjustable sealing guides, as noted, permit orienting of the air box 40 properly with respect to the adjacent vacuum box 14 which further ensures a controlled air release and effective fluid film air bearings.

In addition to the end members, one or more dams such as the member 70, may be disposed along the length of the air box 40, conveniently at a section joint, to divide the air chamber 45 and/or the chamber 46 into zones of differing pressure proportional to varying applied external loads, if desired. All of the joints between the air box, the support structure, and the clamping members may be sealed with silicon rubber adhesive to avoid air leakage or any buildup of process materials and resultant corrosion.

It will accordingly be seen that an improved aircushion and fluid film air bearing arrangement is provided that operates to produce a more evenly balanced supporting force across the undersurface of a member riding thereon, such as a transport belt used in horizontal belt vacuum filters, thereby reducing uneven belt wear. A single source of air pressure admitted through a longitudinal slot creates the central air cushion bearing and the fluid film air bearings on each side, which arrangement operates to prevent any direct contact between the belt surface and any of the mechanical parts. In addition, the mechanical parts may be readily formed and assembled and are easily maintained.

While air has been described as the fluid in forming the bearings, other gases or compressible fluids may also be found suitable carrying out the invention.

What is claimed is:

1. A horizontal belt vacuum filter of the type comprising:
    (a) continuously moving filter cloth means for receiving and filtering a feed slurry deposited thereon;
    (b) continuously moving transport belt means for supporting said filter cloth means and having means therein for passing the filtrate therethrough;
    (c) vacuum box means disposed beneath said transport belt means for drawing the filtrate through said filtrate passing means; and
    (d) fluid bearing means disposed on the opposite sides of said vacuum box means for supporting the outer ends of said moving transport belt means;

the improvement wherein said fluid bearing means comprises:
    (a) box means, having a flat upper surface with a centrally disposed longitudinal opening therein, for communicating a compressible fluid under pressure upwardly therefrom;
    (b) chamber means in said box means extending along and communicating with said opening for receiving said fluid under pressure and communicating it to said opening; and
    (c) guide means disposed along the upper edges of said box means for forming a substantially fluid-tight chamber in combination with said flat upper surface and the underside of said moving transport belt means, said guide means comprising two L-shaped members, and fastening means for connecting said L-shaped members respectively to a pair of spaced upstanding side walls of said box means, one leg of each of said L-shaped members being in a plane parallel to said moving transport belt means whereby a fluid aircushion bearing is formed for supporting said underside of said moving transport belt means.

2. A fluid bearing for supporting a member moving longitudinally therealong, comprising:
    (a) box means, having a flat upper surface with a centrally disposed longitudinal opening therein, for communicating a fluid under pressure upwardly therefrom;
    (b) chamber means in said box means extending along and communicating with said opening for receiving fluid under pressure and communicating it to said opening, and
    (c) guide means disposed along the upper edges of said box means for forming a substantially fluid tight chamber in combination with said flat upper surface and the underside of a moving member, said guide means comprising two L-shaped members, and fastening means for connecting said L-shaped members respectively to a pair of spaced upstanding side walls of said box means, one leg of each of said L-shaped members being in a plane parallel to said moving member, whereby a fluid cushion bearing is formed for supporting said underside of said moving member.

3. A bearing as in claim 2, wherein said L-shaped members comprise two layers of low friction material, said material being disposed on the upper surface of each of said one leg of said L-shaped members, for forming fluid from air bearings between said underside of said moving member and said layers.

4. A bearing as in claim 2 wherein said box means is constructed of sheet material and comprises:
    (a) said spaced upstanding side walls;
    (b) inturned flanges on the lower ends of said side walls; and
    (c) horizontally disposed walls on the upper ends of said side walls forming a flat upper surface centrally divided by said opening.

5. A bearing as in claim 4 wherein said chamber means is constructed of sheet material and comprises:
    (a) inwardly inclined side walls with upper edges joining the inner ends of said upper walls at the opening; and
    (b) a base wall connected to the lower ends of said inclined walls and lying in the plane of said inturned flanges.

* * * * *